United States Patent [19]
Min

[11] Patent Number: 5,292,086
[45] Date of Patent: Mar. 8, 1994

[54] REEL DRIVE APPARATUS FOR MAGNETIC TAPE RECORDING AND PLAYBACK UNITS

[75] Inventor: Young H. Min, Suwon, Rep. of Korea

[73] Assignee: Samsung Electronics Co., Ltd., Suwon, Rep. of Korea

[21] Appl. No.: 933,072

[22] Filed: Aug. 21, 1992

[30] Foreign Application Priority Data
Aug. 21, 1991 [KR] Rep. of Korea ............... 91-13460

[51] Int. Cl.⁵ ............................................. G11B 15/18
[52] U.S. Cl. .................... 242/200; 242/68.1; 242/201
[58] Field of Search ............. 242/200, 201, 204, 206, 242/208, 209, 210, 199, 68.1; 360/96.3, 96.4; 464/30, 160, 182

[56] References Cited
U.S. PATENT DOCUMENTS
4,562,497 12/1985 Morinaga et al. ............. 242/199 X
4,725,016  2/1988 Marvelli ........................... 242/199

Primary Examiner—Daniel P. Stodola
Assistant Examiner—John P. Darling
Attorney, Agent, or Firm—Sughrue, Mion, Zinn, Macpeak & Seas

[57] ABSTRACT

A reel drive apparatus for rotatably driving a reel of a magnetic tape recorder and playback unit, the apparatus including an elongated mounting shaft disposed on the base chassis of the magnetic tape recorder and playback unit, a reel hub rotatably engaging a tape reel, a reel disc having a tubular journal bearing portion and a cylindrical drum which is mounted on the elongated mounting shaft so that it supports and rotates together with the reel hub, and an elastic and resilient geared belt tensely mounted on the cylindrical drum and engaged to the last-stage gear in a drive gear train.

15 Claims, 2 Drawing Sheets

REEL DRIVE APPARATUS FOR MAGNETIC TAPE RECORDING AND PLAYBACK UNITS

FIELD OF THE INVENTION

The present invention relates to a reel drive apparatus for rotatably driving the reel of a cassette tape in magnetic tape recording and playback units, such as VCRs, digital audio cassette players, and camcorders.

BACKGROUND OF THE INVENTION

FIG. 1 shows a conventional reel drive mechanism, such as in a VCR, for providing a rotational drive for the supply and take-up reels of the cassette tape in which magnetic recording medium is accommodated. As shown in FIG. 1, the mechanism include a reel hub 14 for revolving with a reel of the cassette tape, a reel disc 16 having a tubular journal bearing portion which is assembled inside the reel hub 14, a torque transmitting plate 20 provided with the tubular journal bearing portion and tightly fitted inside the reel hub 16, a flat ring-type felt 18 placed between the reel drive gear 17 and the torque transmitting plate 20, helical springs 15 disposed to provide a frictional force so that gear 17 is urged against plate 20 through felt 12, and a mounting shaft 12 on which the above-mentioned elements are mounted so as to be rotational. With this conventional design configuration, if the reel drive gear 17 is engaged to, and rotatably driven by, a last-stage gear in a driver gear train, then the torque transmitting plate 20, in tight surface contact with the reel drive gear 17 by spring 15, begins to rotate about the mounting shaft 12, and therefore carries the twisting moment onto the reel hub 14 through the reel disc 16.

In this type of conventional drive mechanism design, the clutching force is generated between the reel drive gear 17 and the torque transmitting plate 20 by the spring force applied on the upper surface of the reel drive gear 17. This clutching force may be appropriately adjusted by proper selection of the spring constant so that a proper transmission of driving torque can be provided and, at the same time, the transmission of an overload twisting moment is prevented because of the slip on the upper surface of the flat ring-type felt 18.

Due to the fact that several elements must be employed in the conventional design in order to ensure the proper transmission of the driving torque (and to prevent an overload twisting moment), the cost of manufacture is high and the disassembly as well as the assembly of the mechanism is difficult. In addition to these problems, the bulky volume of the conventional reel drive mechanism has proven to be a significant hindrance to recorder/player design improvement, specifically, improved design to lower the weight and volume, especially the thickness, of the elements.

SUMMARY OF THE INVENTION

It is an object of the present invention to provide an improved reel drive mechanism which reduces the cost of manufacture, and which lends itself to easy assembly and disassembly.

It is a further object of the present invention to reduce the weight and volume, especially the thickness, of the units employed in a reel drive mechanism by reducing the number of elements relative to the conventional mechanism.

These and other objects are accomplished by the present invention which provides a reel drive apparatus for rotatably driving a reel of a cassette tape in a magnetic tape recording and playback unit. The inventive apparatus includes an elongated mounting shaft fixed onto the main chassis of the magnetic tape recording and playback unit; a reel hub integrally and rotatably engaged with the cassette tape reel; a reel disc with a tubular journal bearing portion and a cylindrical drum portion having a concentric configuration which is mounted on the elongated mounting shaft so that it may rotate together with the reel hub thereon while supporting same; and an elastic and resilient geared belt which is tensely mounted on the cylindrical drum and which is engaged to the last-stage gear in a drive gear train.

Further, it is desirable to insert an annular felt between the cylindrical drum of the reel disc and the elastic and resilient geared belt in order to ensure a greater frictional force and a reliable trip action.

DETAILED DESCRIPTION OF THE PREFERRED EMBODIMENTS

Figure 1:
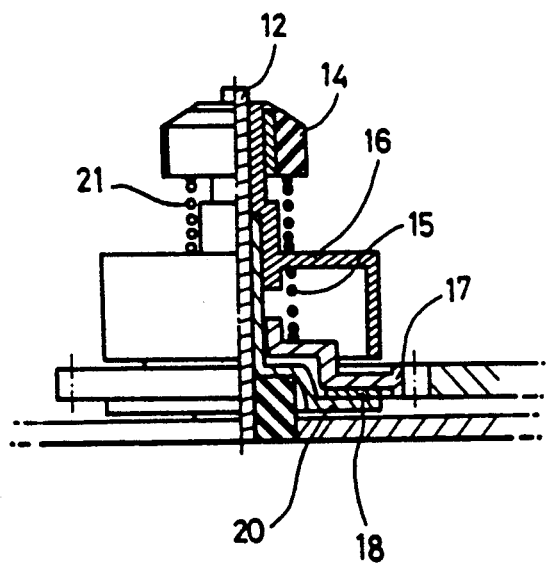
FIG. 1 is a side plan view with a partially cut-away longitudinal sectional view of a conventional reel drive mechanism.
Figure 2:
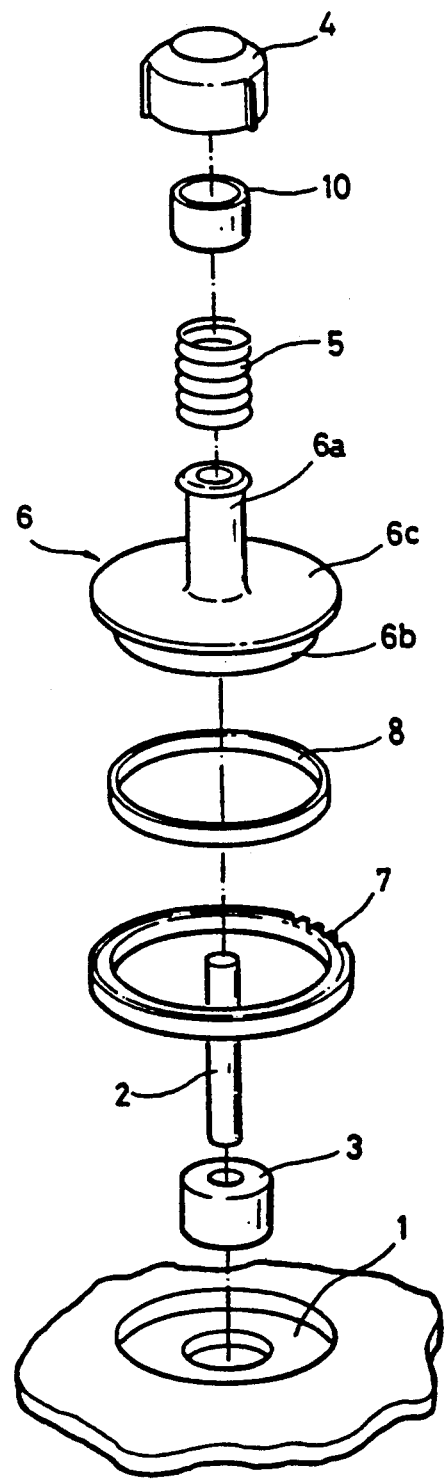
FIG. 2 is an exploded view of the reel drive apparatus of a preferred embodiment of the present invention.
Figure 3:
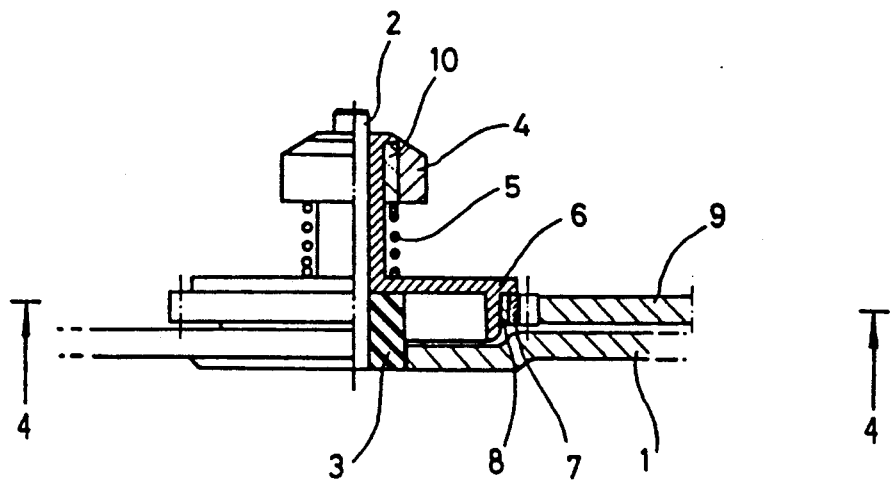
FIG. 3 is a side plan view with a partially cut-away longitudinal sectional view of the preferred embodiment of the present invention.

FIG. 2 is an exploded view of the reel drive apparatus according to the invention, and a side view and longitudinal sectional view of the apparatus are shown in FIG. 3. As shown in these figures, the reel drive apparatus is provided with configurational integrity by assembling a reel hub 4 having rims thereon to secure proper engagement to the cassette tape reel (not shown) so that the reel hub 4 can rotatably drive the cassette tape reel, and a reel disc 6 having a tubular journal bearing portion 6a, a disk-shaped portion 6c and a concentric cylindrical drum 6b. The reel hub 4 is loaded on the tubular journal bearing portion 6a of the reel disc 6 together with a reel hub bushing 10 disposed between reel hub 4 and reel disc 6 by a tight fit or by a stopper step implemented on one end of the tubular journal bearing portion 6a. A compression helical spring 5 is placed between the reel hub bushing 10 and the reel disc 6 so that the spacing between bushing 10 and reel disc 6 can be elastically maintained. An elongated mounting shaft 2 is designed such that free rotational motion is ensured when the reel disc 6 is loaded thereon. In addition, a support bushing 3 is installed such that the overall reel drive mechanism assembly including the support bushing 3 can freely rotate with respect to the main chassis 1 by providing a clearance.

An annular felt 8 is glued to the cylindrical drum 6b of the reel disc 6, and a ring-shaped geared belt 7 made of elastic and resilient material, such as rubber, is tensely mounted thereon in order to transmit the twisting moment from the last gear 9 (FIG. 3) of the drive gear train by meshing. The annular felt 8 transmits torque carried over from the drive gear train to the reel drive apparatus by the frictional force developed by the hoop stresses caused by the tension of the geared belt 7. However, when the transmitted torque is beyond a specific critical value, then slipping takes place so that excessive torque is not transmitted to the reel drive assembly.

Figure 4:
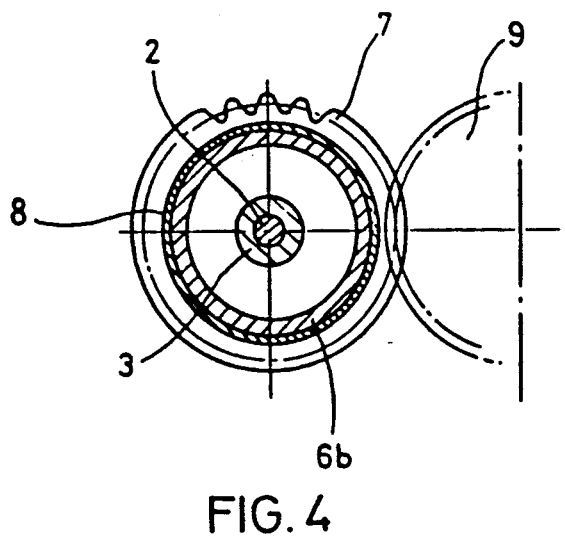
FIG. 4 is a cross sectional view of the preferred embodiment of the torque transmitting and trip action mechanism taken through plane A—A of FIG. 3.

FIG. 4 is a planar cross-sectional view of a section taken through A—A of FIG. 3 which depicts how meshing is provided between the last-stage gear 9 of the drive gear train and the geared belt 7. As discussed, the assembly between the annular felt 8 and the cylindrical drum 6b of the reel disc 6 is bond-tight, and the frictional surface contact is maintained by the tension of the geared belt 7. Accordingly, the maximum allowable torque at which slipping is to take place is specifically determined by the amount of tension in the geared belt 7, and therefore can be controlled by adjusting the tension thereof. The gear teeth on the outer radial surface of the geared belt 7 are engaged to the last-stage gear of the driver gear train as discussed previously.

With this design configuration, the clutching force is controlled directly by the frictional force between the outer radial surface of the felt 8 and the inner radial surface of the geared belt 7, and a twisting moment that is smaller than the specific critical value is transmitted to the reel hub 4 via reel disc 6, and excessive torque is not transmitted. Therefore, elements which were required in the conventional design configuration are not necessary for the control of the clutching force according to the present invention.

In order to develop a clutching force between the annular felt 8 and the geared belt 7, a different type of fibrous layer or a viscous oil layer may be employed.

As has been described, with the reel drive apparatus of the present invention, the design configuration has been simplified due to fewer elements being required. As a result, the invention provides improved assembly during manufacture, and reduces the weight and thickness of the assembled audio and video units to which the present invention can be applied.

Many modifications of the preferred embodiments of the invention disclosed herein will readily occur to those skilled in the art. Accordingly, the invention is limited only by the appended claims.

What is claimed is:

1. A reel drive apparatus for rotatably driving a cassette tape reel in a magnetic tape recording and playback unit, the unit including a main chassis, the reel drive apparatus comprising:
   an elongated mounting shaft fixed onto the main chassis of the magnetic tape recording and playback unit;
   a reel hub for rotatably engaging the cassette tape reel;
   a reel disc having a tubular journal bearing portion and a concentric cylindrical drum, said reel disc being mounted on the elongated mounting shaft so that said reel disc supports and rotates together with the reel hub; and
   an elastic and resilient geared belt tensely mounted on a peripheral surface of the cylindrical drum of said reel disc and engaged to a last-stage gear in a drive gear train.

2. The reel drive apparatus as defined in claim 1, further comprising a layer of fibrous material disposed between said cylindrical drum and said geared belt.

3. The reel drive apparatus as defined in claim 2, wherein said fibrous material layer is felt glued onto the cylindrical drum of said reel disc.

4. The reel drive apparatus as defined in claim 2, wherein said fibrous material layer has an annular shape.

5. The reel drive apparatus as defined in claim 1, further comprising a support bushing for supporting said elongated mounting shaft on the main chassis.

6. A reel drive apparatus for rotatably driving a tape reel in a tape recording and playback unit, comprising:
   a reel hub for rotatably engaging the tape reel;
   a reel disc for rotatably supporting said reel hub;
   an elastic and resilient geared belt mounted on a peripheral surface of said reel disc;
   a drive mechanism engaged with said elastic and resilient gear belt.

7. The reel drive apparatus as defined in claim 6, wherein the tape recording and playback unit includes a main chassis, and wherein the apparatus further comprises an elongated mounting shaft fixed onto the main chassis.

8. The reel drive apparatus as defined in claim 7, wherein said reel disc includes a tubular journal bearing portion and a cylindrical drum portion, and wherein said reel disc is mounted on said elongated mounting shaft.

9. The reel drive apparatus as defined in claim 8, wherein said reel disc further includes a disc-shaped portion between said tubular journal bearing portion and said cylindrical drum portion.

10. The reel drive apparatus as defined in claim 8, wherein said elastic and resilient geared belt is mounted on the cylindrical drum portion of said reel disc.

11. The reel drive apparatus as defined in claim 10, wherein said drive mechanism comprises a drive gear train having a last-stage gear, and wherein said elastic and resilient geared belt is engaged to the last-stage gear.

12. The reel drive apparatus as defined in claim 8, further comprising a layer of fibrous material disposed on the cylindrical drum portion of said reel disc.

13. The reel drive apparatus as defined in claim 12, wherein said fibrous material layer is felt which is glued onto the cylindrical drum portion of said reel disc.

14. The reel drive apparatus as defined in claim 12, wherein said fibrous material layer is disposed between the cylindrical drum portion of said reel disc and said elastic and resilient geared belt.

15. The reel drive apparatus as defined in claim 6, wherein the tape recording and playback unit is one of a video cassette recorder, an audio tape recorder and a camcorder.

* * * * *